US00RE34441E

United States Patent [19]

Ruckenbauer et al.

[11] E Patent Number: Re. 34,441

[45] Reissued Date of Patent: Nov. 16, 1993

[54] PRESSURE SENSOR

[75] Inventors: Friedrich Ruckenbauer, Graz; Josef Winkler, Judendorf-Strassengel, both of Austria

[73] Assignee: AVL Gesellschaft für Verbrennungskraftmaschinen und Messtechnik m.b.H. Prof.Dr.Dr.H.c. Hans List, Graz, Austria

[21] Appl. No.: 978,081

[22] Filed: Nov. 17, 1992

Related U.S. Patent Documents

Reissue of:

[64] Patent No.: 4,986,129
Issued: Jan. 22, 1991
Appl. No.: 501,884
Filed: Mar. 30, 1990

[30] Foreign Application Priority Data

Mar. 30, 1989 [AT] Austria ..... A-737/89

[51] Int. Cl.[5] ..... G01L 7/08; G01L 9/00

[52] U.S. Cl. ..... 73/756; 73/723

[58] Field of Search ..... 73/725, 746, 756, 115, 73/723, 727, 726, 753, 754, 706; 338/4, 42

[56] References Cited

U.S. PATENT DOCUMENTS

| | | | |
|---|---|---|---|
| 1,956,403 | 4/1934 | Scott | 73/115 |
| 3,697,919 | 10/1972 | Orth et al. | 338/42 |
| 4,753,109 | 6/1988 | Zables | 73/115 |
| 4,982,608 | 1/1991 | Märki et al. | 73/756 |
| 5,142,914 | 9/1992 | Kusakabe et al. | 73/756 |

FOREIGN PATENT DOCUMENTS 0230491 8/1987 European Pat. Off. .

*Primary Examiner*—Donald O. Woodiel
*Attorney, Agent, or Firm*—Watson, Cole, Grindle & Watson

[57] ABSTRACT

In order to prevent tilting and torsional stresses from entering the actual sensor element of a pressure sensor comprising a supporting part and an integrated sensor part, the proposal is put forward that the corresponding surfaces of a shoulder of the supporting part and of a fastening element screwed into the measuring bore be configured as the lateral surfaces of cones whose generating lines intersect with the longitudinal axis of the supporting part, or as parts of the surface of a sphere whose center is situated on the longitudinal axis of the sensor part. The two corresponding faces transmitting the pressure from the fastening element onto the supporting part, and permitting a slight tilt of the longitudinal axis of the supporting part relative to the axis of the internal thread of the measuring bore.

12 Claims, 2 Drawing Sheets

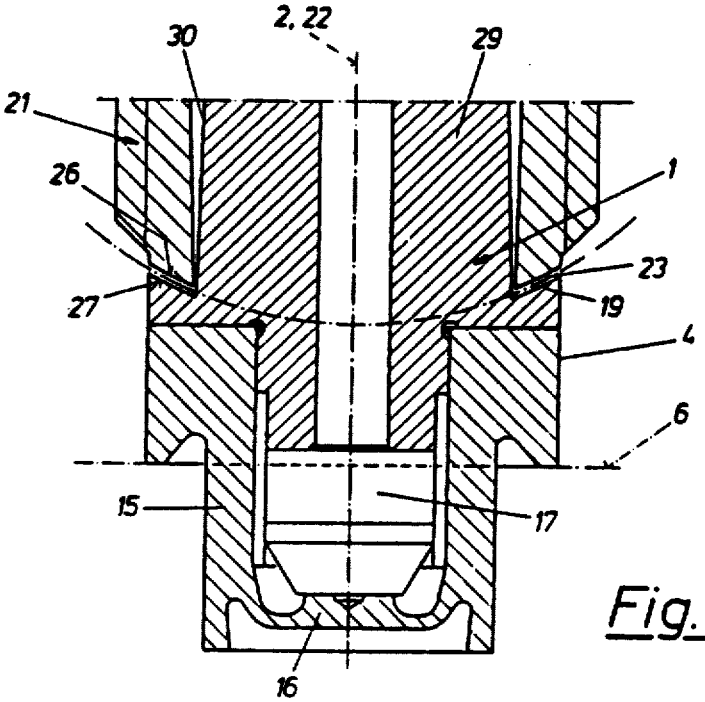
Fig. 3
Fig. 4a
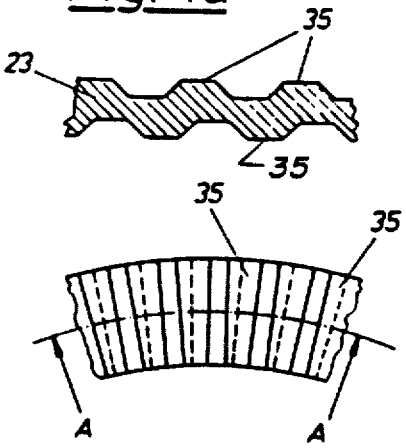
Fig. 4b
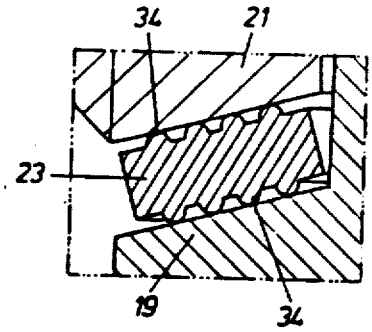
Fig. 5

PRESSURE SENSOR

Matter enclosed in heavy brackets [ ] appears in the original patent but forms no part of this reissue specification; matter printed in italics indicates the additions made by reissue.

BACKGROUND OF THE INVENTION

This invention relates to a pressure sensor, in particular for measuring high pressures, comprising a supporting part held in a measuring bore of a component, and an integrated sensor part holding a sensor element, which is in at least indirect contact with a membrane subject to the pressure to be determined, the sensor part being provided with a sealing area for sealing the pressure sensor against the measuring bore.

DESCRIPTION OF THE PRIOR ART

A pressure sensor of the above type is described in EP-A1 0 230 491, FIG. 1, for example, and is referred to as state of the art in this paper. The pressure sensor is mounted in a measuring bore in a component surrounding a measuring chamber, e.g. a hydraulic line, an injection line, or a combustion chamber, the measuring bore consisting of a lower section with a smaller diameter and an upper section with a larger diameter. A step is formed where the two sections meet, against which is pressed the sealing area or zone of a flange surrounding the sensor part, in order to seal off the measuring chamber. The sealing area itself either is self-sealing or it is sealed by means of an additional gasket. The step should be normal to the axis of the internal thread of the measuring bore.

The section of the bore with the larger diameter has an internal thread corresponding to an external thread on the supporting part of the pressure sensor, which may thus be screwed into the measuring bore.

The sensor part holds the actual sensor element, which is preferably configured as one or more suitable piezoelectric measuring elements, whose electrical charges are carried off via a signal lead running through the supporting part. The bottom of the pressure sensor, which is subject to the pressure of the medium to be examined, includes a part containing a membrane with a thickened center area, transmitting the force generated by the pressure of the medium to the sensor element.

With its level top surface facing the supporting part, the sensor part is contiguous with a corresponding level surface of the supporting part, to which it is welded. The separating plane defined by the level top surface of the sensor part is normal to the mean axis of the pressure sensor.

In order to obtain a satisfactory sealing effect the sealing surface of the sensor part must be pressed against the step in the measuring bore with considerable force. For this purpose sufficiently high tightening torques of up to 60 Nm are required when the pressure sensor is screwed into position. The extremely high sealing forces resulting therefrom will also act upon the sensor part. It should be noted in this context that the above demand concerning a normal position of the step in the measuring bore relative to the axis of the thread cannot always be met with sufficient accuracy, which will result in an inhomogeneous distribution of forces along the flange of the sensor part. This will cause unbalanced loading of the sensor element, with new imbalances each time it is inserted, leading to signal errors. In addition, large torsional stresses will occur in the sensor area when the pressure sensor is screwed in, which will also have unfavorable effects on the measured result.

In FIG. 2 of the above EP-A1 0 230 491 is presented a pressure sensor which is intended to eliminate these problems. The supporting part is provided with a sealing shoulder which is in contact with the step in the measuring bore and constitutes the actual sealing site. The supporting part has a tube-like projection axially extending beyond the sealing shoulder, to which is bonded the sensor part. This will reduce the transmission of mounting and sealing forces on the sensor element of the sensor part. But even this variant will not prevent torsional forces from entering via the tube-like projection tightly surrounding the sensor part to which it is welded, nor will it guarantee a homogeneous distribution of forces in the area of the sealing shoulder.

SUMMARY OF THE INVENTION

It is an object of this invention to develop a pressure sensor of the above type in such a way as to permit the sealing surface of the sensor part to be pressed against the step in the measuring bore with a force that is comparatively constant along the circumference of the sealing site, while largely eliminating the influence of torsional forces upon the sensor part, or rather, the sensor element.

In the invention this object is achieved by configuring the corresponding surfaces of a shoulder of the supporting part and of a fastening element that is screwed into the measuring bore as lateral surfaces of a cone whose generating lines intersect with the longitudinal axis of the supporting part, or as parts of the surface of a sphere whose center is situated on the longitudinal axis of the sensor part, the corresponding surfaces transmitting the pressure from the fastening element onto the supporting part, and permitting a slight tilt of the longitudinal axis of the supporting part relative to the axis of the internal thread of the measuring bore.

This will permit a slight tilting of the supporting part in order to adjust it to the plane of the step in the measuring bore, thus ensuring homogeneous distribution of the exerted pressure. As the supporting part and the sensor part attached to it are not subject to any rotational movement when they are sealed in place during assembly, no torsional forces are generated in this area.

The invention would also permit that only one of the surfaces be configured as a cone or as part of the surfaces of a sphere, and that its corresponding surface, which is made from a non-hardened material, be deformed to assume a conical or spherical shape only when the tightening screw is tightened.

Slight torsional forces, which are transmitted to the supporting part when the fastening element is screwed in, may be largely compensated by the supporting part if an extreme pressure lubricant film is provided between the corresponding surfaces.

The fastening element may be configured as a tightening screw, whose center opening is penetrated by a projection of the supporting part, an annular gap being provided between tightening screw and projection, which is tapered towards the compensating element. Due to this conical gap the supporting part has enough freedom of movement within the tightening screw to be allowed to tilt.

According to the invention a permanently deformable compensating element may be provided between the two corresponding surfaces, a further proposal providing that one of the surfaces of the fastening element or the shoulder of the supporting part that are in contact with the deformable compensating element, have ridges with a semi-circular or trapezoidal profile, which may be pressed into the compensating element. The permanent deformation, e.g. of the sealing ring, may be used for determining the axial deviation or tilt of the pressure sensor in the measuring bore after its removal.

In a preferred variant at least one of the surfaces of the deformable compensating element that are in contact with the fastening element or the shoulder of the supporting part, has ridges with a semi-circular or trapezoidal profile, which extend either radially or circularly. The main advantage of this variant is its low manufacturing cost due to the fact that the angular or rounded ridges are provided on the compensating element itself.

It has proved to be of advantage if the deformable compensating element has a cross-section in the shape of a Z or H.

In order to facilitate frequent re-insertion of the pressure sensor the deformable compensating element should be replaceable and should be made of copper alloy, preferably brass, or of soft steel.

BRIEF DESCRIPTION OF THE DRAWINGS

Following is a brief description of the invention as illustrated by the accompanying drawings, in which FIGS. 1 to 3 show different variants of a pressure sensor as described by the invention, presented as longitudinal sections.

FIGS. 4a and 4b give a section and a view from above of a compensating element of a pressure sensor as shown in FIGS. 1 to 3, FIG. 5 represents a variant of FIG. 4a.

DETAILED DESCRIPTION OF PREFERRED EMBODIMENTS

Figure 1:
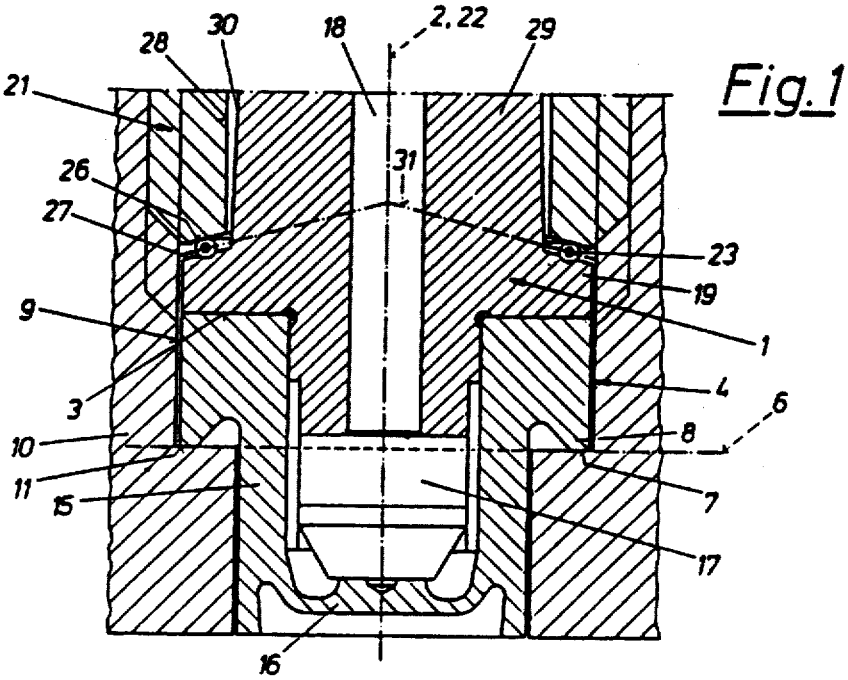

The pressure sensor shown in FIG. 1 comprises a supporting part 1 which is in contact with the sensor part 4 via a face 3 normal to its longitudinal axis 2. The supporting part 1 and the sensor part 4 are welded together. The sealing area 7 of a continuous flange 8 around the sensor part 4, which is formed in the sealing plane 6, is pressed against a step 11 after the pressure sensor has been inserted into the measuring bore 9 of a component 10, which step 11 separates the two sections of the bore 9, i.e. one with a larger diameter, which has an interior thread, and one with a smaller diameter. The membrane part 15 of the sensor, which extends beyond the sealing plane 6, comprises a membrane 16 with a reinforced center area, which is in contact with the sensor element 17, pressing it against the supporting part 1 on account of a certain pre-load. The electrical charges which are built up in the sensor element 17 when it is subjected to pressure, are carried off through electric leads (not shown here) running in the center bore 18 of the supporting part 1.

The supporting part 1 is not directly screwed into the measuring bore 9, preferably, but is provided with a shoulder 19 whose surface 27 cooperates with a fastening element 21 configured as a tightening screw to be screwed into the measuring bore 9. The surface of the fastening element facing the shoulder 19 has the reference number 26. In order to compensate deviations of the longitudinal axis 2 of the supporting part 1 from the thread axis 22 of the internal thread of the measuring bore 9 (which coincide in this drawing), and to permit a slight tilting of the supporting part 1 in the measuring bore 9, the corresponding surfaces 26 and 27 are configured as the lateral surfaces of cones, whose generating lines 31 intersect with the longitudinal axis 2 of the supporting part 1. In addition, a deformable compensating element 23 may be inserted between the shoulder 19 of the supporting part 1 and the tightening screw 21, for example, a deformable ring.

The center opening 28 of the fastening element 21 is penetrated by a projection 29 of the supporting part 1, an annular gap 30 being provided between the fastening element 21 and the projection 29, which is tapered towards the compensating element 23, and which permits a slight tilting of the supporting part 1 and the sensor part 4 in the measuring bore 9.

In the following variants identical parts have identical reference numbers.

Figure 2:
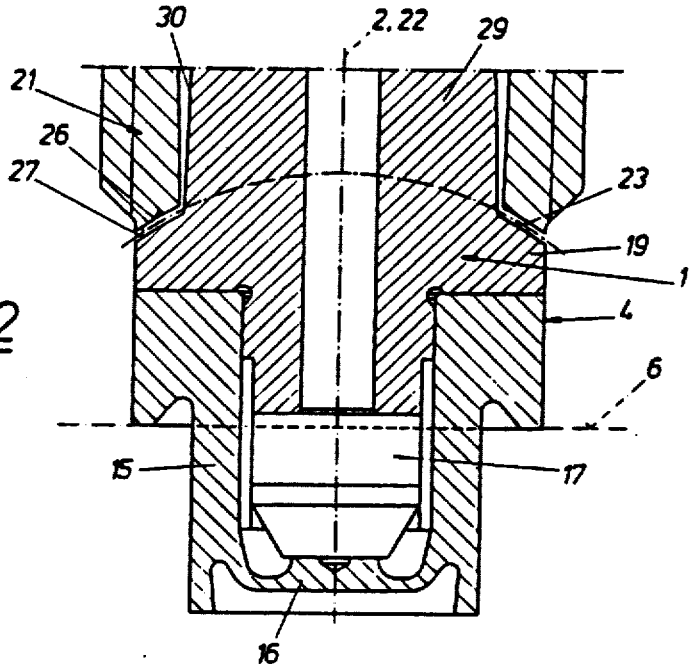

FIGS. 2 and 3 show a pressure sensor in which both the surface 26 of the fastening element 21 facing the supporting part 1, and the corresponding surface 27 of the shoulder 19 are configured as parts of the surface of a sphere, whose center is situated on the longitudinal axis 2 of the sensor part 4. In the variant of FIG. 2 the center of the sphere is located in the area of the sealing plane 6, in that of FIG. 3—with the direction of curvature reversed—in the area of the projection 29. In both instances the tilting movement is facilitated by an extreme pressure lubricant film between the two surfaces 26 and 27.

FIGS. 4a and 4b show a detail of a variant of a compensating element 23 according to FIG. 1, i.e. FIG. 4b a view from above and FIG. 4a a section along line A—A in FIG. 4b. In this variant radially extending ridges 35 with sharp edges are provided for deformation. It would be possible of course, to place corresponding ridges 35 on the fastening element 21 or the shoulder 19 as well.

FIG. 5 shows a variant of FIG. 4a, in which the compensating element 23 has circularly extending ridges 34 of semi-circular cross-section.

As an additional benefit the compensating elements of all variants will largely prevent normal forces from entering the supporting part 1 or the sensor part 4, when the fastening element configured as a tightening screw is tightened.

We claim:

1. A pressure sensor comprising a supporting part insertable in a measuring bore having an internal thread, and an integrated sensor part holding a sensor element, which is in at least indirect contact with a membrane subject to the pressure to be determined, said sensor part being provided with a sealing area for sealing said pressure sensor against said measuring bore, wherein corresponding surfaces of a shoulder of said supporting part and of a fastening element which can be screwed into said measuring bore are configured as lateral surfaces of a cone whose generating lines intersect with the longitudinal axis of said supporting part, said corresponding surfaces transmitting the pressure from said fastening element onto said supporting part, permitting a slight tilt of the longitudinal axis of said supporting part relative to the axis of said internal thread of said measuring bore.

2. A pressure sensor according to claim 1, wherein an extreme pressure lubricant film is provided between said corresponding surfaces.

3. A pressure sensor according to claim 1, wherein a deformable compensating element is provided between said corresponding surfaces.

4. A pressure sensor according to claim 3, wherein one of said corresponding surfaces of said fastening element or said shoulder of said supporting part being in contact with said deformable compensating element, have ridges with a semi-circular or trapezoidal profile, which are pressed into said compensating element.

5. A pressure sensor according to claim 3, wherein at least one of the surfaces of said deformable compensating element being in contact with said fastening element or said shoulder of said supporting part, has ridges with a semi-circular or trapezoidal profile, which extend either radially or circularly.

6. A pressure sensor according to claim 3, wherein said deformable compensating element is replaceable and is made of copper alloy, preferably brass, or of soft steel.

7. A pressure sensor comprising a supporting part insertable in a measuring bore having an internal thread, and an integrated sensor part holding a sensor element, which is in at least indirect contact with a membrane subject to the pressure to be determined, said sensor part being provided with a sealing area for sealing said pressure sensor against said measuring bore, wherein corresponding surfaces of a shoulder of said supporting part and of a fastening element which can be screwed into said measuring bore are configured as parts of the surface of a sphere whose center is situated on the longitudinal axis of said supporting part, said corresponding surfaces transmitting the pressure from said fastening element onto said supporting part, permitting a slight tilt of the longitudinal axis of said supporting part relative to the axis of said internal thread of said measuring bore.

8. A pressure sensor according to claim 7, wherein an extreme pressure lubricant film is provided between said corresponding surfaces.

9. A pressure sensor according to claim 7, wherein a deformable compensating element is provided between said corresponding surfaces.

10. A pressure sensor according to claim 9, wherein one of said corresponding surfaces of said fastening element or said shoulder of said supporting part being in contact with said deformable compensating element, have ridges with a semi-circular or trapezoidal profile, which are pressed into said compensating element.

11. A pressure sensor according to claim 9, wherein at least one of the surfaces of said deformable compensating element being in contact with said fastening element or said shoulder of said supporting part, has ridges with a semi-circular or trapezoidal profile, which extend either radially or circularly.

12. A pressure sensor according to claim 9, wherein said deformable compensating element is replaceable and is made of copper alloy, preferably brass, or of soft steel.

* * * * *